United States Patent [19]

Workman

[11] 4,066,373
[45] Jan. 3, 1978

[54] FASTENING DEVICE

[75] Inventor: David E. Workman, Orange, Calif.

[73] Assignee: Samsonite Corporation, Denver, Colo.

[21] Appl. No.: 711,692

[22] Filed: Aug. 4, 1976

[51] Int. Cl.² .................................................. A44B 21/00
[52] U.S. Cl. ................................. 403/391; 24/81 CC; 297/248
[58] Field of Search .......... 24/81 CC, 73 CC, 73 AP; 403/188, 391; 297/248; 108/64; 248/68 CB, 74 PB

[56] References Cited

U.S. PATENT DOCUMENTS

| D. 234,204 | 1/1975 | Miller et al. ................. 24/81 CC X |
| 1,934,396 | 11/1933 | Bales ..................................... 297/248 |
| 3,421,187 | 11/1969 | Ryder ................................. 248/74 PB |
| 3,906,592 | 9/1975 | Sakasegawa et al. ............ 24/81 CC |

FOREIGN PATENT DOCUMENTS

| 932,746 | 9/1955 | Germany ............................ 403/391 |
| 862,398 | 3/1961 | United Kingdom .............. 24/81 CC |

Primary Examiner—Andrew V. Kundrat
Attorney, Agent, or Firm—George J. Netter

[57] ABSTRACT

A device for releasably fastening objects such as chairs together in spaced-apart relationship comprises a pair of complementary U-shaped gripping means hingedly connected to one another at one end of the device, means for releasably interlocking the device at the other end thereof, and means for maintaining objects in spaced-apart relationship when the gripping means of the device are interengaged.

5 Claims, 5 Drawing Figures

FASTENING DEVICE

This invention relates to a device for releasably fastening together objects such as chairs in spaced-apart relationship.

An object of this invention is to provide a readily attachable and detachable device for engaging the legs and other parts of two or more chairs to hold them together in side-by-side, spaced-apart relationship.

Another object of the invention is to provide a device for simply, quickly and efficiently joining together objects such as chairs without the use of tools or other mechanical means other than the device itself.

More particularly, this invention provides a device for releasably fastening together objects such as chairs in spaced-apart relationship comprising a pair of complementary U-shaped gripping means hingedly connected to each other through an integral, unique hinge formed at one end of the device. The device alos includes means, preferably integrally formed in the device, for releasably interlocking the U-shaped gripping means at the end of the device opposite the end where the hinge is formed.

Each gripping means comprises an elongated, substantially flat outer portion and a pair of integrally formed, relatively flat end portions joined at an angle in the range of about 15° to about 90° to the elongated, substantially flat outer portions. In the preferred embodiment, the end portions and the side wall portion of the gripping means are joined by rounded, integrally formed junctions that minimize injury to objects and persons coming into contact with the device. The inner surface of each gripping means may, and preferably does have, a profile that complements the dimensions of the objects to be held within the device. This profile may be formed in whole or in part by the angle(s) between the end portions and the elongated substantially flat outer portion by the shape of the inner surface itself, by means attached to the inner surface, or by a combination of these or other means. At least a portion of one edge of each gripping means, and preferably both edges, is formed with a flange and preferably an integrally-formed flange, that provides structural support to the device. The flange may run the length of the side-wall portion, and the width of one or both end portions.

Each of the U-shaped gripping means has at least one projection from its inner wall adapted to meet with or engage a complementary projection from the inner wall of the opposing gripping means when the two gripping means are interengaged. Objects to be fastened together by the new device are positioned on opposite sides of these inner wall projections, the gripping means are interengaged, and the projections meet to form a spacer bridging the inner walls of the two gripping means. The projections from the inner side wall of each gripping means may be embodied in the device in several different ways. In one embodiment, the complementary projections fit within one another. Beveling or notching the upper portion of one projection to fit within the opening in the other projection are examples of this embodiment. In the preferred embodiment, the projections are cylindrical, thus minimizing damage to the objects joined together by the device, and are of approximately equal cross-section so as to form a spacer, where the gripping means meet, that maintains objects joined together in stable alignment.

One or more of the elongated, substantially flat portions of the gripping means may be provided with one or more openings to engage means on the object or objects to be held together, thus minimizing movement of the device on the surface of these objects and rigidifying the fastening together of these objects.

The integral hinge of the device is formed by outwardly protruding portions from each of the opposing end portions. Each of the outwardly protruding portions projects from the plane of the end portion to which it is attached toward the outwardly protruding portion from the opposing end portion, and each forms an angle in the range of about 95° to about 125° with respect to the plane of that end portion. Thus, the two protrusions in combination form a flexible, resilient hinge that can better withstand the stresses imposed by movement of objects joined together by the device than do most hinges otherwise formed.

Means for releasably interlocking the gripping means are preferably formed integrally in the gripping means. In the preferred embodiment, the gripping means comprises a hook integrally formed at one end of one of the gripping means, and a complementary opening or notch integrally formed at the opposing end of the other gripping means for releasably engaging the hook where the gripping means are interengaged. The hook preferably projects outwardly from its end portion, and the opposing end portion is notched on its inner surface to overlap the hook-bearing end portion where the hook and complementary opening are engaged. In this embodiment, the resilient hinge acts to urge the hook into the notch where the hook and notch are engaged.

Referring now to the drawings, FIG. 1 illustrates two pairs of chair legs joined together in spaced-apart relationship by two devices of this invention;

FIG. 2, a perspective view, illustrates the device with the gripping means disengaged from one another;

Figure 1:
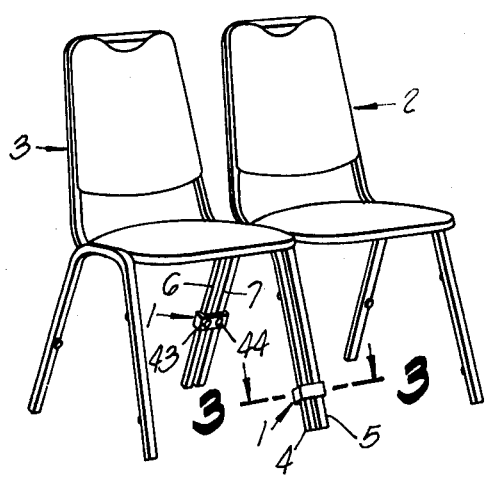

Referring now to FIG. 1, embodiments 1 of the new device are shown engaging and fastening together legs 4 and 5 and legs 6 and 7 of a pair of stacking chairs 2 and 3. Legs 4 and 5 and legs 6 and 7 each have a rectangular cross-sectional profile, and are surmounted with projecting buttons 43 and 44 that engage with openings 21 and 22 of devices 1, thus preventing their movement up or down on the legs and struts. In FIG. 1, the new device are shown in a locked position.

Figure 2:
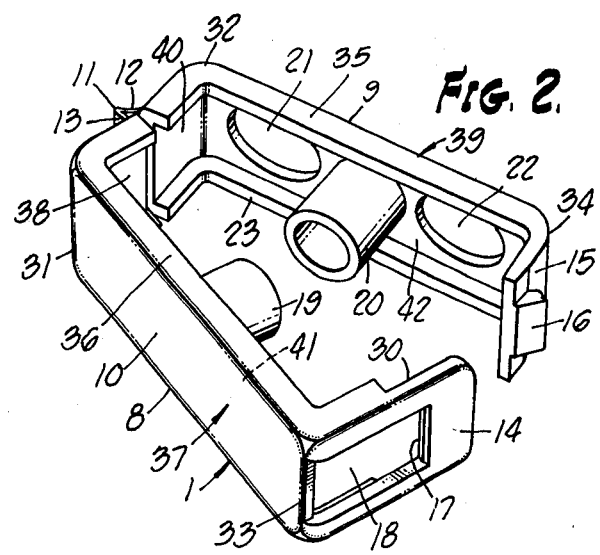

FIG. 2 shows device 1 with U-shaped gripping means 37 and 39 disengaged from one another. Gripping means 37 is formed with a substantially flat elongated sidewall portion 10 having integrally joined thereto end portions 14 and 38 at substantially right angles to side wall portion 10. The inner surface 41 of gripping means 37 and end portions 14 and 38 form a pair of rectangular profiles that approximate the shape of legs 4 and 5 and legs 6 and 7, insuring that the device engages these legs and struts snugly and securely. Junctions 31 and 33 integrally formed between sidewall portion 10 and end portions 14 and 38 are rounded to minimize damage to objects and persons coming into contact therewith. End portion 38 has a protrusion 13 therefrom which forms a part of an integral hinge between gripping means 37 and 39. Protrusion 13 extends towards gripping means 37 at an angle with respect to the relatively flat surface of end portion 38 at an angle in the range of about 95° to about 125°.

Similarly, gripping means 39 comprises elongated relatively flat sidewall portion 9 joined to a pair of end portions 15 and 40 at substantially right angles to the side wall portion 9. The end portions of gripping means 39 joins elongated side wall portion 9 at integrally-formed junctions having rounded edges 32 and 34, which minimize damage to objects and persons coming into contact with the device. Inner surface 42 of gripping means 39 and end portions 15 and 40 form a pair of rectangular profiles that approximate the shape of legs 4 and 5 and legs 6 and 7, insuring that the device engages these legs snugly and securely. Where gripping means 37 and 39 are interengaged, the rectangular profiles on either side of spacer 20 meet to form openings 45 and 46 that engage rectangularly-profiled objects such as legs 4 and 5 and legs 6 and 7 of chairs 2 and 3.

Gripping means 39 includes relatively flat end portion 40 which has projecting therefrom, and toward the opposing gripping means 37, protruding portion 12 which, together with protruding portion 13, forms integral, resilient hinge 11. Projection 12 forms an angle with respect to the flat end portion 40 of about 95° to about 125°, and that angle is preferably the same as protruding portion 13 forms with respect to end portion 38 of gripping means 37. The edges of each gripping means 37 and 39 include integrally formed reinforcing flanges 8, 36, 35 and 23. These flanges run the length of the sidewall of each gripping means, and all or nearly all of the span of end portions 38 and 40 as well.

Figure 3:
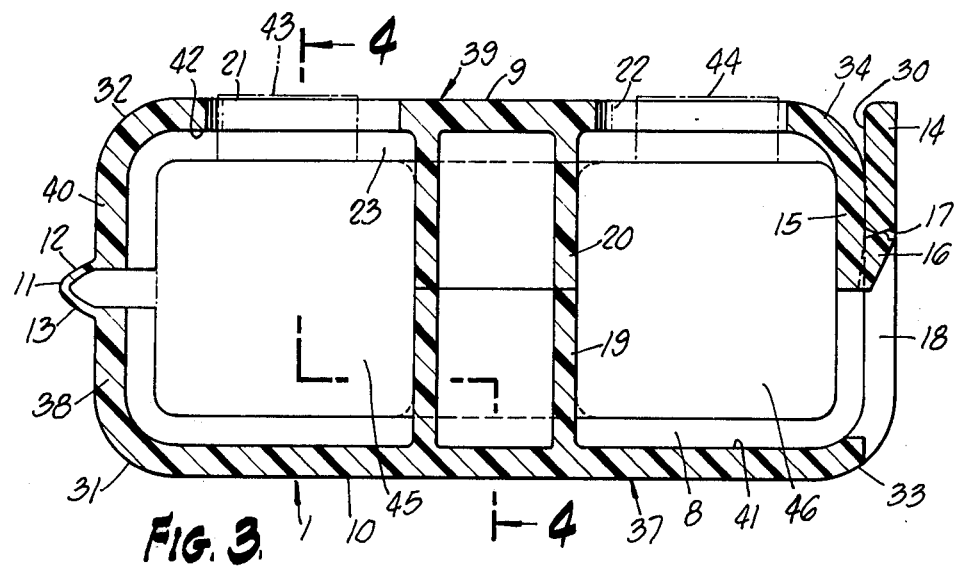
FIG. 3 is a cross-sectional view of the new device taken along line 3—3 of FIG. 1, with the gripping means interengaged.
Figure 4:
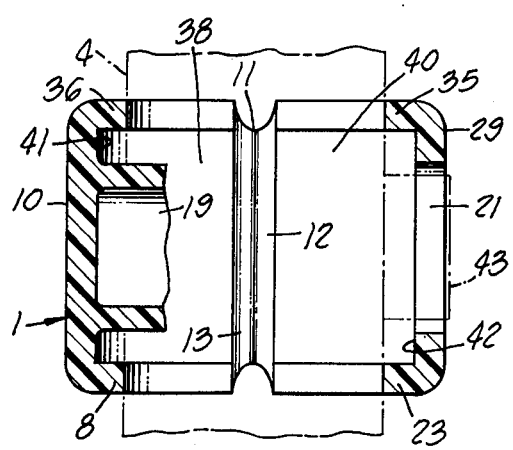
FIG. 4 is a cross-sectional view of the new device taken on line 4—4 of FIG. 3.
Figure 5:
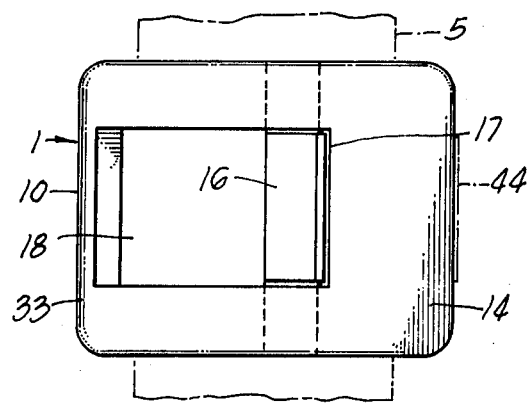
FIG. 5 is an end view of the means for releasably interlocking the gripping means.

End portion 15 includes integrally formed hook 16, which engages opening 17 in end portion 14 where the gripping means are interengaged. Notched portion 30 in end portion 14 overlaps end portion 15 so that hook 16 engages notch 17 from the inside and projects outwardly, as seen in FIG. 3. Resilient spring 11 formed by projections 12 and 13 tends to urge gripping means 37 and 39 apart, thus also urging hook 16 into groove 17.

Gripping means 39 includes a pair of openings 21 and 22 in substantially flat sidewall portion 9 which may engage projections from the objects to be joined, such as buttons or other projections from the legs of the chairs seen in FIG. 1. More or fewer openings of these kinds may be provided as desired. Engagement of these openings with means on the objects to be joined stabilizes the junction between the objects, and prevents movement of the fastening device along the objects themselves.

Projecting from the inner walls 41 and 42 of gripping means 37 and 39 are cylindrical projections 19 and 20, respectively, which meet when gripping means 37 and 39 are interengaged. Cylindrical projections 19 and 20 are of substantially similar cross-sectional dimensions so as to form a spacing means of substantially uniform cross-section between gripping means 37 and 39 when these gripping means are interengaged, as seen in FIG. 3.

The device of the invention is preferably made from thermoformable or thermosettable plastic or rubber, or a combination thereof. The device may include inserts made of metal or other rigid material where the objects to be joined will be subjected to severe stresses. However, where the objects to be joined are chair legs or other struts on similar objects, the device of the invention may be sufficiently strong if made from a tough durable rubber or plastic such as polypropylene.

What is claimed is:
1. A device for releasably fastening objects together in spaced-apart relationship comprising:
  a pair of complementary U-shaped gripping means hingedly connected to each other through an integral hinge, and having means for releasably interlocking said gripping means at the other end of said device include a hook on one gripping means which projects outwardly from its end portion, and a complementary opening in the opposing gripping means for releasably engaging said hook, the walls defining said opening being notched to overlap the hookbearing end portion;
  each gripping means having an elongated, substantially flat outer portion and a pair of integral, relatively flat end portions formed at an angle in the range of about 15° to about 90° to said elongated substantially flat outer portion, said integral hinge being formed by outwardly protruding portions from each opposing end portion;
  each said protruding portion projecting from the plane of its end portion toward the opposing protruding portion, and at an angle in the range of about 95° to about 125° with respect to the plane of its portion; and
  each said gripping means having at least one projection from its inner surface adapted to meet a complementary projection from the opposing inner surface.
2. The device of claim 1 wherein said hook and said complementary opening are integrally formed in said device.
3. The device of claim 2 wherein each of said elongated substantially flat portions have reinforcing flanges integrally formed along at least one edge thereof.
4. The device of claim 3 wherein each of said elongated substantially flat portions has a reinforcing flange along each of its edges.
5. A device for releasably fastening objects together in spaced-apart relationship comprising:
  a pair of complementary U-shaped gripping means hingedly connected to each other through an integral hinge, and having means for releasably interlocking said gripping means at the other end of said device;
  each gripping means having an elongated, substantially flat outer portion at least one of which elongated substantially flat portions has at least one opening therein adapted to engage at least one of the objects releasably fastened together and to align said device thereon and a pair of integral, relatively flat end portions formed at an angle in the range of about 15° to about 90° to said elongated substantially flat outer portion;
  said integral hinge being formed by outwardly protruding portions from each opposing end portion, each said protruding portion projecting from the plane of its end portion toward the opposing protruding portion, and at an angle in the range of about 95° to about 125° with repsect to the plane of its portion; and
  each said gripping means having at least one projection from its inner surface adapted to meet a complementary projection from the opposing inner surface.

* * * * *